United States Patent Office 2,694,130
Patented Nov. 9, 1954

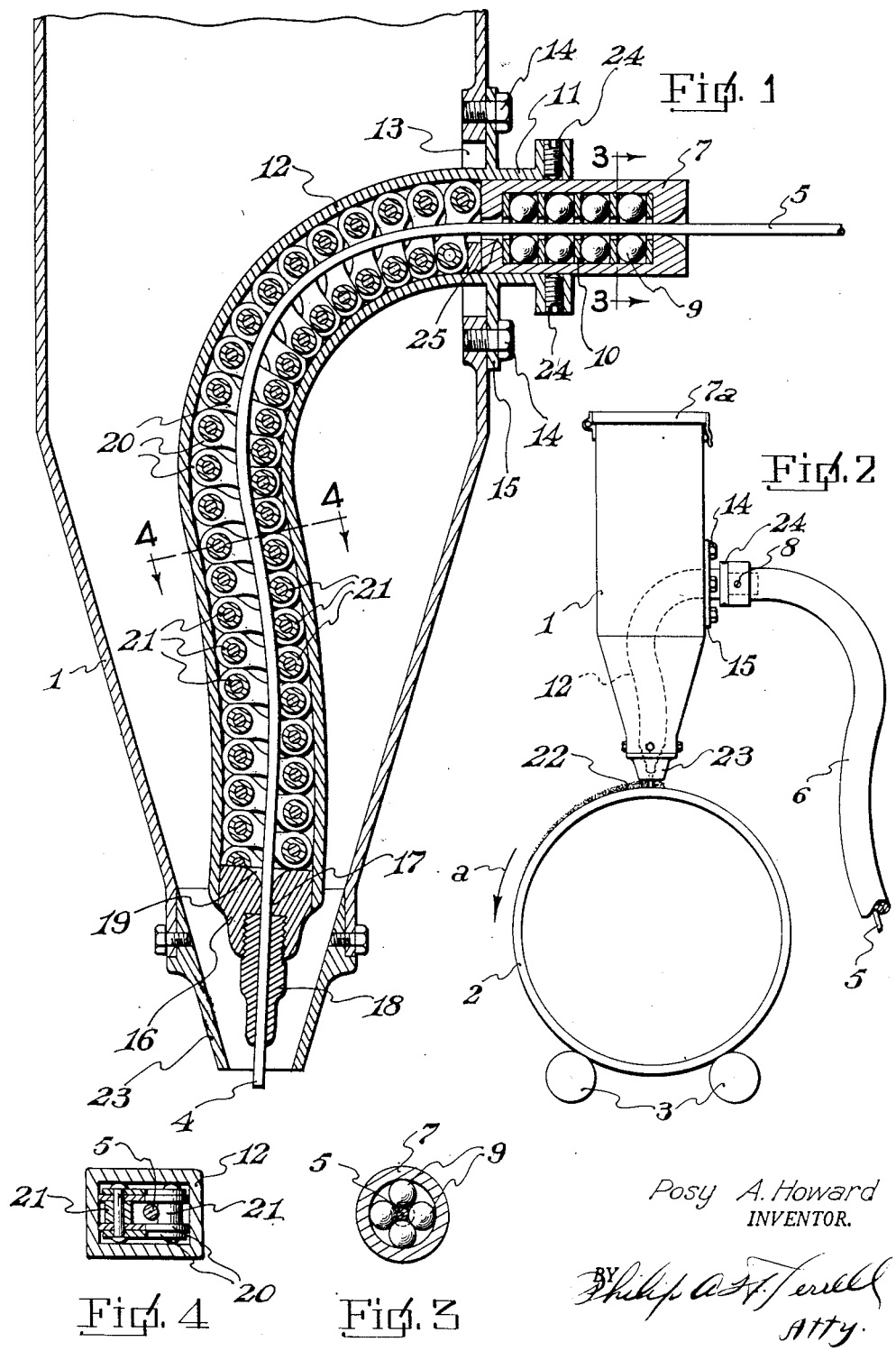

2,694,130

ARC WELDING WIRE GUIDE

Posy A. Howard, Tulsa, Okla.

Application August 28, 1952, Serial No. 306,761

2 Claims. (Cl. 219—8)

The invention relates to wire guides used in connection with arc welding where the welding wire is in circuit with the work, and has for its object to provide anti-frictional means within a casing extending towards the apex end of a flux funnel, and cooperating with the wire whereby it will uniformly feed in bowed condition towards the work, and in a position where the flux will surround the end of the wire where it contacts the work for insuring maximum efficiency of weld and prevent oxidizing of the weld until partially cooled. The device is particularly adapted for use on a continuously rotated pipe, and where the welding wire is fed automatically through the guide.

A further object is to provide a welding wire guide extending into the side of a flux funnel and thence curving inwardly and downwardly and terminating adjacent the lower end of the flux funnel, and provided with a plurality of rollers on opposite sides of the wire, and at a right angle to the plane of the bend in the wire so the wire will be uniformly fed through the guide at a uniform speed and without a jerking action.

A further object is to provide the upper outer end of the guide with anti-frictional ball bearings through which ball bearings the welding wire is guided as it is fed to the welding point or to a position between the rollers when the end of the welding wire is initially passed through the guide.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:

Figure 1 is a vertical longitudinal sectional view through the funnel and guide.

Figure 2 is a side elevation of the funnel, showing the funnel in position above a rotating pipe to be welded.

Figure 3 is a vertical transverse sectional view taken on line 3—3 of Figure 1.

Figure 4 is a sectional view taken on line 4—4 of Figure 1.

The device is particularly adapted for use in connection with flux funnels 1, placed above a large rotating pipe 2, which rotates in the direction of arrow *a*, and rotated on driven rollers 3, which rollers are operated through any suitable mechanism, electrically controlled, when the end 4 of the welding wire 5 is in circuit with the work. The welding wire is also automatically fed by the circuit and pushed through a flexible cable 6 leading to the funnel.

The welding wire is relatively stiff and considerable difficulty has been experienced in uniformly feeding the wire to the work and avoiding a jerky feed incident to the spring action of the wire.

The funnel 1 is provided with a closure 7a opened to supply the proper amount of granular flux to the chamber of the funnel. This is usually done at the starting of the welding operation with the apex of the funnel adjacent the work. The upper end of the cable 6 is connected to the ball bearing casing 7 by set screw 8. Disposed within the casing 7 are spaced ball bearings 9 held between spacer washers 10. The casing 7 extends into the outer end 11 of the roller bearing tube 12.

The tube 12 extends through an opening 13 in the side of the funnel 1 and is attached to the funnel by means of bolts 14 which bolts extend through the flange 15 carried by the tube 12. Tube 12 extends inwardly and downwardly into the chamber of the funnel 1 and terminates on the axis of the funnel and adjacent the lower end of the funnel as shown in Figure 1. The lower end of the tube 12 is closed by a plug 16 having a guide aperture 17 therethrough, and through which guide aperture the end of the welding wire extends. The welding wire also extends through a replaceable guide tip 18. A tapered recess 19 is provided in the upper end of the member 16 so the wire will be guided to the aperture 17 when the wire is passed through the guide as a whole.

Disposed within the tube 12 is a plurality of roller carrying frames 20, which frames extend across the tube 12 and are provided with rollers 21 on opposite sides of the wire. It will be noted that the rollers 21 are disposed transversely in relation to the plane of the bent welding wire, and in positions whereby they will engage opposite sides of the welding wire as the wire flexes incident to the feeding through the guide. It has been found that the wire is uniformly fed or guided, by this roller arrangement, to the work within the flux pile 22, as shown in Figure 2, thereby obviating the difficulties now experienced with such devices.

The discharge end of the funnel 1 is provided with a removable funnel tip 23 whereby access to the lower end of the funnel may be had, for instance for renewing the wire guide 18. Casing 7 is held in position by set screws 24, and the casing 7 is provided with a flared opening 25 for guiding the end of the wire to a position where it will pass between the various rollers 21.

To thread the welding wire it is only necessary to pass the end 4 between the ball members 9, through the flared opening 25 and a continued push thereon will cause the end of the wire to feed downwardly between the rollers 21 and through the flared guide 19, and thence through members 16 and 18. From this point onward the feeding is automatic through the usual feeding mechanism, as long as the work is in the circuit.

The invention having been set forth what is claimed as new and useful is:

1. The combination with a flux funnel, of a welding wire guide comprising a tubular casing disposed axially of the funnel with its upper end bent and extending through the wall of the funnel, pairs of opposed rollers extending the length of said casing, said rollers of each pair being spaced apart to provide a passage to receive a flexible welding wire and means connecting the opposed rollers of each pair together, said pairs of rollers being independently movable in said casing.

2. A device set forth in claim 1 including a tubular member disposed in the upper end of said casing having a series of ball bearings between which the welding wire is inserted with guide openings at each end of said member.

References Cited in the file of this patent

UNITED STATES PATENTS

| Number | Name | Date |
|---|---|---|
| 1,954,999 | Hopkins | Apr. 17, 1934 |
| 2,474,075 | Falley | June 21, 1949 |
| 2,478,525 | Cutrer | Aug. 9, 1949 |
| 2,536,294 | Laudis et al. | Jan. 2, 1951 |